UNITED STATES PATENT OFFICE.

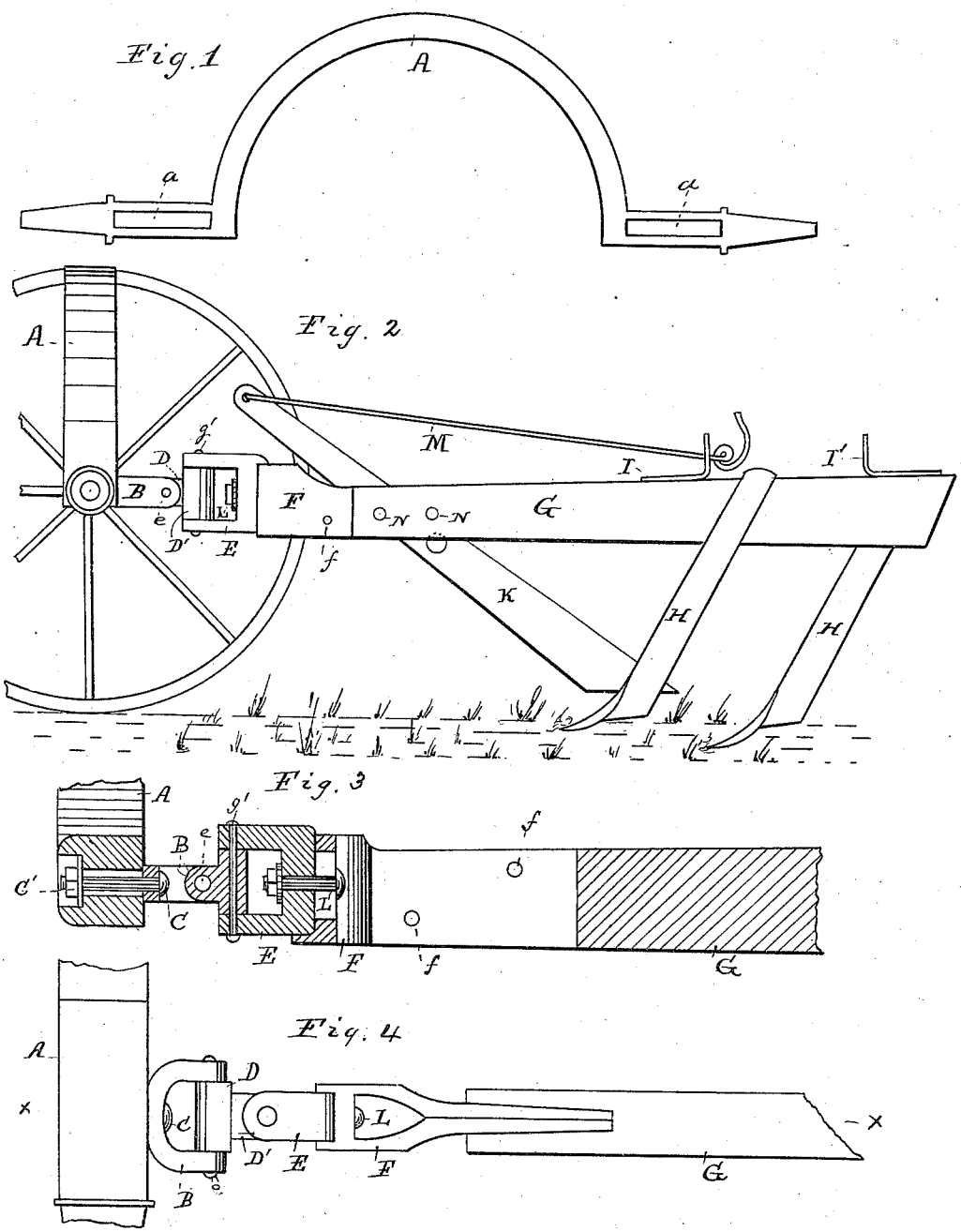

RICHARD CRACRAFT, OF BERWICK, ASSIGNOR OF ONE-HALF TO J. HARTS MILLER, OF ABINGDON, ILLINOIS.

CULTIVATOR.

SPECIFICATION forming part of Letters Patent No. 311,645, dated February 3, 1885.

Application filed April 30, 1884. (No model.)

*To all whom it may concern:*

Be it known that I, RICHARD CRACRAFT, a citizen of the United States, residing at Berwick, in the county of Warren and State of Illinois, have invented certain new and useful Improvements in Cultivators, of which the following is a specification, reference being had therein to the accompanying drawings.

This invention relates to improvements in arched wheel-plows, and is intended to straddle a row of plants in cultivating the same, and has for its object to provide an adjustable flexible coupling and a drag to carry the cultivator-plows when out of the ground, which may be attached to any cultivator. This object is attained by the devices illustrated in the accompanying drawings, forming a part of this specification, in which—

Figure 1 is a view showing an arched axle. Fig. 2 is a side elevation which shows the arched axle, the coupling, plow-beam, drag, and plows, one of the wheels being removed. Fig. 3 is a transverse section of the axle on the line $x$ $x$ of Fig. 4. Fig. 4 is a plan.

The letter A indicates an arched axle having slots $a$ for the passage of bolts C, which are secured to the forked pieces B. The bolts C are provided with nuts C', which, when loosened, permit the bolts C to be moved in a longitudinal direction from one end to the other of either of the slots $a$, for the purpose of adjustment of the couplings, together with the plow-beams G and plows H, so as to regulate the distance of the plows with regard to the plants under cultivation. The forked pieces or yokes B are perforated to receive the bolts C, and also to receive bolts $e$, which pass through longitudinal holes in the pieces D, and form pivots, upon which they turn freely. Attached to piece D, and placed at right angles thereto, is the piece D'. These two parts may be made of separate pieces or of a single casting or forging. The part D' has a longitudinal hole, $g$, to receive a bolt or rivet, $g'$, which passes through the hole $g$, and also through suitable openings in the clevis E, upon which the latter turns as upon a pivot. A bolt, L, passes through an opening in the clevis and through a slot, F', formed by joining two pieces of metal, F, together by means of rivets $f$. The pieces F, when joined, form a wedge-shape casting, which is secured to the end of the plow-beam G by having a suitable opening therein to receive it, and by bolts N, which pass transversely through the beam and casting.

H H are plows of any of the usual forms in general use, suitably attached to the beam G.

K is a drag pivoted to the beam G. It is perforated at the top to receive one end of a metal rod, M, which is bent to the proper angle for this purpose. The other end of this bar is twisted, so as to form a stop when inserted in the forked openings or hooks of two pieces of metal, I I', secured to the upper side of the plow-beam G, so as to maintain the drag in a position to permit the plows to enter the ground, or, when the cultivator is to be moved to another place, to lift the plows and hold them clear of the ground.

It will be readily seen that the slots $a$ in the arched axle A will permit the couplings to the beams G to be adjusted as to the distance which it may be desired to place them apart, and that by making the couplings in the manner hereinbefore described the connection between the plow-beams G and the axle of the machine will be flexible, or in the nature of a universal joint, whereby the axle and the plows will be able to assume various positions in relation to each other.

Having described my invention, what I desire to secure by Letters Patent and claim is—

1. In a cultivator, the combination of arched axle A, slots $a$, bolts C, yokes B, parts D D', provided with bolts $e$, clevis E, bolt $g'$, bolt L, and casting F, with a plow-beam, G, substantially as described, and for the purposes set forth.

2. In a cultivator, the plow-beam G, in combination with drag K, metal bar M, hooks I I', and plows H H, substantially as described, and for the purposes set forth.

In testimony whereof I affix my signature in presence of two witnesses.

RICHARD CRACRAFT.

Witnesses:
   J. P. DAY,
   WM. DEGGES.